United States Patent
Lee

(10) Patent No.: US 8,570,439 B2
(45) Date of Patent: Oct. 29, 2013

(54) BROADCASTING PROCESSING APPARATUS AND CONTROL METHOD THEREOF

(75) Inventor: An-na Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1336 days.

(21) Appl. No.: 12/027,473

(22) Filed: Feb. 7, 2008

(65) Prior Publication Data
US 2009/0031372 A1 Jan. 29, 2009

(30) Foreign Application Priority Data
Jul. 25, 2007 (KR) .................. 10-2007-0074598

(51) Int. Cl.
*G09B 7/04* (2006.01)

(52) U.S. Cl.
USPC ...................... 348/564; 434/156; 434/185

(58) Field of Classification Search
USPC ............... 358/100; 434/156, 185; 348/564
See application file for complete search history.

(56) References Cited

U.S. PATENT DOCUMENTS

| | | | | |
|---|---|---|---|---|
| 5,748,382 A * | 5/1998 | Maguire, Jr. | | 359/676 |
| 6,151,075 A | 11/2000 | Shin et al. | | |
| 6,283,760 B1 * | 9/2001 | Wakamoto | | 434/156 |
| 6,307,589 B1 * | 10/2001 | Maguire, Jr. | | 348/333.03 |
| 6,507,368 B1 * | 1/2003 | Sakashita | | 348/448 |
| 7,480,444 B2 * | 1/2009 | Yamauchi et al. | | 386/248 |
| 7,675,572 B2 | 3/2010 | Lee et al. | | |
| 7,882,523 B2 * | 2/2011 | Utsuki et al. | | 725/41 |
| 2005/0008337 A1 * | 1/2005 | Yamauchi et al. | | 386/95 |
| 2007/0047911 A1 * | 3/2007 | Haruki | | 386/95 |

FOREIGN PATENT DOCUMENTS

| | | |
|---|---|---|
| KR | 10-1999-0049348 A | 7/1999 |
| KR | 10-2006-0030724 A | 4/2006 |

OTHER PUBLICATIONS

Communication dated Aug. 29, 2013 from the Korean Intellectual Property Office in a counterpart application No. 10-2007-0074598.

* cited by examiner

*Primary Examiner* — Khanh Dinh
(74) *Attorney, Agent, or Firm* — Sughrue Mion, PLLC

(57) ABSTRACT

A broadcasting processing apparatus and a control method thereof are provided. The apparatus includes a signal receiver which receives an image signal having image content; a user selection unit which selects movie content from the image content; a storage unit; and a controller which determines whether a received image signal is a film image signal if the movie content is selected through the user selection unit, and stores the image signal in the storage unit if the image signal corresponds to the film image signal.

17 Claims, 5 Drawing Sheets

BROADCASTING PROCESSING APPARATUS AND CONTROL METHOD THEREOF

CROSS-REFERENCE TO RELATED APPLICATION

This application claims priority from Korean Patent Application No. 10-2007-0074598, filed on Jul. 25, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to broadcasting processing, and more particularly, to broadcasting processing apparatuses which displays a film image signal, and a control methods thereof.

2. Description of the Related Art

A video cassette recorder (VCR) which requires a tape medium has been mainly used to record an analog broadcasting signal. In recent years, however, a digital broadcasting which has more strengths than analog broadcasting and a plurality of recording media to record the digit broadcasting signals are widespread. A digital VCR medium or a recording device employing a hard disc drive (HDD) or an optical disk can be an example of the recording media. Particularly, the HDD has increased its recording capacity up to gigabytes, several tens or several hundreds times that of the tape medium according to rapid progress in technology.

A digital TV receiver which is equipped with various additional functions has appeared corresponding to the full-blown digital broadcasting and various needs of users. One of the spotlighted additional functions of the digital TV is a personal video recorder (PVR), which provides various playing functions, using a large capacity HDD. That is, the PVR stores audio and video information in a digital format unlike the existing analog VCR tape and ensures a picture quality without losing information even if it records and plays unlimitedly.

The PVR displays information such as weekly broadcasting schedule, favorite channels, genre guides of programs on a TV screen and provides unattended recording, temporary pause in live broadcasting, recording the temporarily-paused live broadcasting, replaying, 32-speed detection function, etc.

If the PVR is used, the broadcasting signal is recorded based on time information on reception of the broadcasting signal. If the time information is not correct, unnecessary advertisements may be recorded or the whole image content may not be recorded.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, it is an aspect of the present invention to provide a broadcasting processing apparatus which precisely stores a desired image signal, and a control method thereof.

Also, it is another aspect of the present invention to provide a broadcasting processing apparatus which prevents storage of an unnecessary image signal and saves storage capacity, and a control method thereof.

Additional aspects of the present invention will be set forth in part in the description which follows and, in part, will be obvious from the description, or may be learned by practice of the present invention.

The foregoing and/or other aspects of the present invention are also achieved by providing a broadcasting processing apparatus, the apparatus comprising: a signal receiver which receives an input image signal having image contents; a user selection unit which selects a movie content storing function to store movie content from the image contents; a storage unit; and a controller which determines whether the input image signal is a film image signal if the movie content storing function is selected through the user selection unit, and stores the input image signal in the storage unit if the input image signal is the film image signal.

The broadcasting processing apparatus may further comprise a decoder which decodes the input image signal, and an interlaced-to-progressive converter (IPC) which detects a field image from the decoded input image signal and converts a type of the field image from an interlaced type to a progressive type, wherein the controller calculates a motion change pattern based on a pixel value of the field image during a first period of time, and determines that the input image signal is the film image signal if the calculated motion change pattern corresponds to a preset pattern.

The controller may determine a frame rate of the input image signal by using the field image, and determines that the input image signal is an advertisement image if the frame rate of the input image signal is different from a preset inherent frame rate.

The controller may remove the input image signal from the storage unit.

The controller may determine that the input image signal is an advertisement image if the motion change pattern of the field image during a second period of time longer than the first period of time is different from the preset change pattern, and removes the stored input image signal corresponding to the advertisement image.

The input image signal stored in the storage unit could be an encoded image signal.

The foregoing and/or other aspects of the present invention are also achieved by providing a broadcasting processing apparatus, comprising: a signal receiver which receives an input image signal having image contents; a user selection unit which selects a movie content storing function to store movie content from the image contents; a storage unit; and a controller which determines whether a frame rate of the input image signal is a preset frame rate if a movie content storing function is selected through the user selection unit, and stores the input image signal in the storage unit if the frame rate of the input image signal is identical to the preset frame rate.

The preset frame rate may be 24 frame/1 sec or 25 frame/1 sec.

The broadcasting processing apparatus may comprise a decoder which decodes the input image signal, and an interlaced-to-progressive converter (IPC) which detects a field image from the decoded image signal and converts the field image from an interlaced type to a progressive type, wherein the controller determines the frame rate of the received input image signal based on a motion change pattern of the field image.

The foregoing and/or other aspects of the present invention are also achieved by providing a control method of a broadcasting processing apparatus, the control method comprising: receiving a control signal to store movie content; detecting a field image by decoding an input image signal; determining whether the input image signal is a film image signal by using the field image; and storing the input image signal if the input image signal corresponds to the film image signal.

The determining whether the input image signal is the film image signal may comprise calculating a motion change pattern based on a pixel value of the field image during a first period of time; and determining whether the calculated motion change pattern may is a preset change pattern.

The control method may further comprise determining whether the input image signal is an advertisement image, and may remove the stored image signal if the input image signal is the advertisement image.

The determining whether the input image signal is the advertisement image may comprise determining that the input image signal is the advertisement image if the motion change pattern of the field image during a second period of time longer than the first period of time is different from the preset change pattern.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
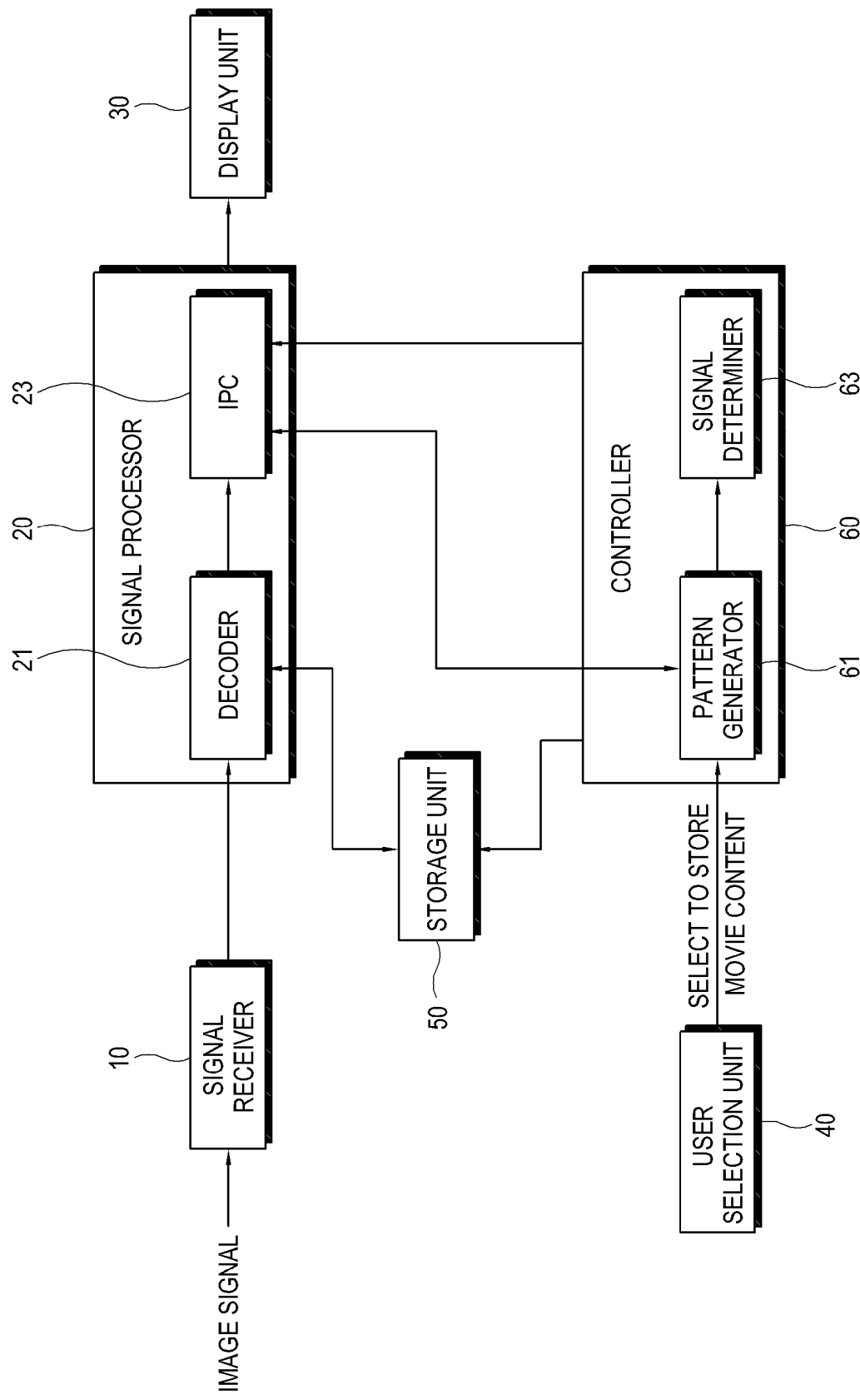
FIG. 1 is a control block diagram of a broadcasting processing apparatus according to a first exemplary embodiment of the present invention.

FIG. 1 is a control block diagram of a broadcasting processing apparatus according to a first exemplary embodiment of the present invention.

As shown therein, a broadcasting processing apparatus includes a signal receiver 10, a signal processor 20, a display unit 30, a user selection unit 40, a storage unit 50 and a controller 60 which controls the foregoing elements. The signal processor 20 includes a decoder 21 and an interlaced-to-progressive converter (IPC) 23. The controller 60 includes a pattern generator 61 and a signal determiner 63. The broadcasting processing apparatus according to the present exemplary embodiment may include a plasma display panel (PDP), a liquid crystal display (LCD) panel, etc. which employs progressive scan. The broadcasting processing apparatus processes 60 fields per second according to national television system committee (NTSC) system.

The signal receiver 10 receives a broadcasting signal from the outside. The broadcasting signal which is received through the signal receiver 10 includes broadcasting programs having various image contents, a broadcasting program schedule, broadcasting program information including genre guides and data broadcasting. The signal receiver 10 may include an antenna (not shown), a tuner (not shown) which tunes a broadcasting signal corresponding to a particular frequency and a low noise amplifier (not shown) which amplifies a broadcasting signal inputted to the tuner.

The signal processor 20 processes the input broadcasting signal to be output to the display unit 30. The signal processor 20 may include an audio processor to process an audio signal and a video processor to process an image signal. The signal processor 20 according to the present exemplary embodiment refers to a video processor which processes an image signal. The audio processor which is not shown decodes the audio signal among the broadcasting signals received to the signal receiver 10 according to an MPEG standard or a Dolby standard, amplifies and outputs the audio signal. The decoder 21 decodes the image signal according to a predetermined standard to be amplified.

Figure 2:
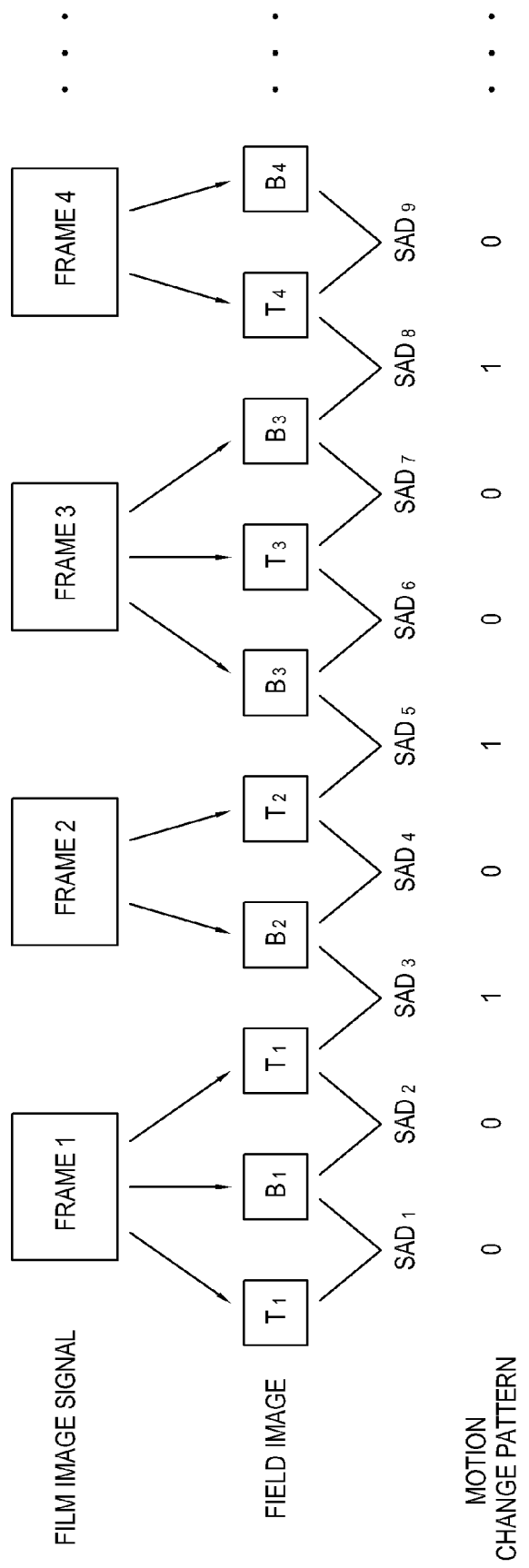
FIG. 2 illustrates an image processing process and a change pattern formed according to the first exemplary embodiment of the present invention.

FIG. 2 illustrates an image processing process and a change pattern formed according to the present exemplary embodiment. Generally, a movie which is released in theaters, i.e. a film image signal includes 24 or 25 frames per second. The generated frames are recorded on film and displayed on a screen according to progressive scan. In the progressive scan, frames of a single image are displayed on a screen at one time.

Meanwhile, most of display apparatuses which are currently used divide a single image into at least two fields to be displayed on a screen sequentially, which is called interlaced scan. The broadcasting processing apparatus employing NTSC system processes 60 fields per second to display an image on a screen. A broadcasting processing apparatus employing phase alternation line (PAL) or sequential couleur a memoire (SECAM) processes 50 fields per second to display an image on a screen.

As shown in FIG. 2, a 3:2 pulldown process is performed to increase the number of fields of an image signal from a single film frame, thereby converting the film image signal into an interlaced scan image signal transmitted by a broadcasting station. The 3:2 pulldown process refers to an image signal processing and is called telecine, in which three fields such as a top field T1, bottom field B1 and a top field T1 are generated from a frame 1, and a bottom field B2 and a top field T2 are generated from a frame 2. The broadcasting station converts the image standard, and transmits the image signal having the changed standard. Then, the decoder 21 receives and decodes the image signal.

The IPC 23 detects a field image from the image signal decoded by the decoder 21, and de-interlaces the field image to be displayed according to progressive scan. That is, the IPC 23 de-interlaces the image signal to change the field image from the interlaced scan into progressive scan. The IPC methods are various so that a plurality of fields is combined into a frame or an interpolation frame may be formed for motion compensation. The IPC 23 performs various image processing operations such as processing the image signal into a format supported by the display unit 30, removing noises from the image signal to improve image quality and forming an interpolation frame.

The display unit 30 displays the received image signal thereon. The display unit 30 may include a liquid crystal display (LCD) panel, an organic light emitting diode (OLED) panel or a plasma display panel (PDP). The broadcasting processing apparatus according to the present exemplary embodiment includes the display unit 30 to display the image signal thereon, but not limited thereto. Alternatively, the broadcasting processing apparatus may include a set-top box which does not have the display unit 30.

The user selection unit 40 is provided to select a particular channel, generate a selection signal to store the image signal received through the selected channel, particularly to store movie contents and output various control signals according to user's manipulation. The movie contents according to the present embodiment include a film image signal manufactured by film, instead of general interlaced broadcasting signals. The user selection unit 40 may include an additional shortcut key or a touch pad or a remote controller wirelessly communicating with the broadcasting processing apparatus, to select a movie content-storing function. The shortcut key or the touch pad may be formed in an external frame of the broadcasting processing apparatus. The touch pad may include a touch panel disposed on the display unit 30. The user selection unit 40 may include general input units such as a keyboard and a mouse.

The storage unit 50 stores the encoded film image signal according to a control of the controller 60 (to be described later). The size of the decoded image signal is larger than that of the encoded image signal, and requires large capacity in the storage unit 50. Thus, the encoded image signal is stored in the storage unit 50 to save the storage capacity. If the stored image signal is played, the image signal is inputted from the storage unit 50 to the decoder 21.

If a user selects the movie content-storing function through the user selection unit 40, the controller 60 determines whether the received image signal is the film image signal. If the image signal corresponds to the film image signal, the controller 60 stores the image signal in the storage unit 50. In a related art broadcasting processing apparatus, a movie is recorded based on the broadcasting time of the received movie content. Thus, the beginning portion or the ending portion of the movie contents may not wholly be recorded. However, according to the present embodiment, the controller 60 determines the type of the image signal corresponding to the movie contents and stores the film image signal only. Thus, a user may store the desired movie contents from the beginning to the end. To perform the foregoing function, the controller 60 includes the pattern generator 61 and the signal determiner 63. The pattern generator 61 calculates a summed absolute difference (SAD) based on a pixel value between neighboring field images, and generates a motion change pattern based on the calculated SAD. The pattern generator 61 generates a motion change pattern of field images during a first period of time. Generally, an interlaced image signal does not have a pulldown process which generates a plurality of field images from a single frame, and has the motion change pattern different from that of the film image signal. Such a difference may be determined by the motion change pattern in approximately 10 to 15 frames. Thus, the first period of time ranges approximately 0.3 to 0.5 second. The pattern generator 61 calculates a pixel value of the field images and calculates $SAD_{1-9}$ between neighboring field images as shown in FIG. 2. If the SAD exceeds a predetermined critical value, the pattern generator 61 generates the motion change pattern, 1. If the SAD does not exceed the predetermined critical value, the pattern generator 61 generates the motion change pattern, 0. The critical value is set to determine whether the field image is generated from one frame or from different frames. In the film image signal, three and two field images are sequentially repeated from a single frame, and the motion change pattern is 001010010100.

The signal determiner 63 determines whether the motion change pattern generated by the pattern generator 61 corresponds to a preset inherent change pattern. If the motion change pattern corresponds to the inherent change pattern, the signal determiner 63 determines that the received image signal is the film image signal. According to the present embodiment, the motion change pattern of the film image signal is set as the inherent change pattern. If the inputted image signal is the film image signal, the image signal is stored in the storage unit 50. If the interlaced image signal is received, it is not stored in the storage unit 50.

The signal determining method, i.e. the method of determining the type of the received image signal is not limited to that described above. Alternatively, the signal determining method may vary.

Figure 3:
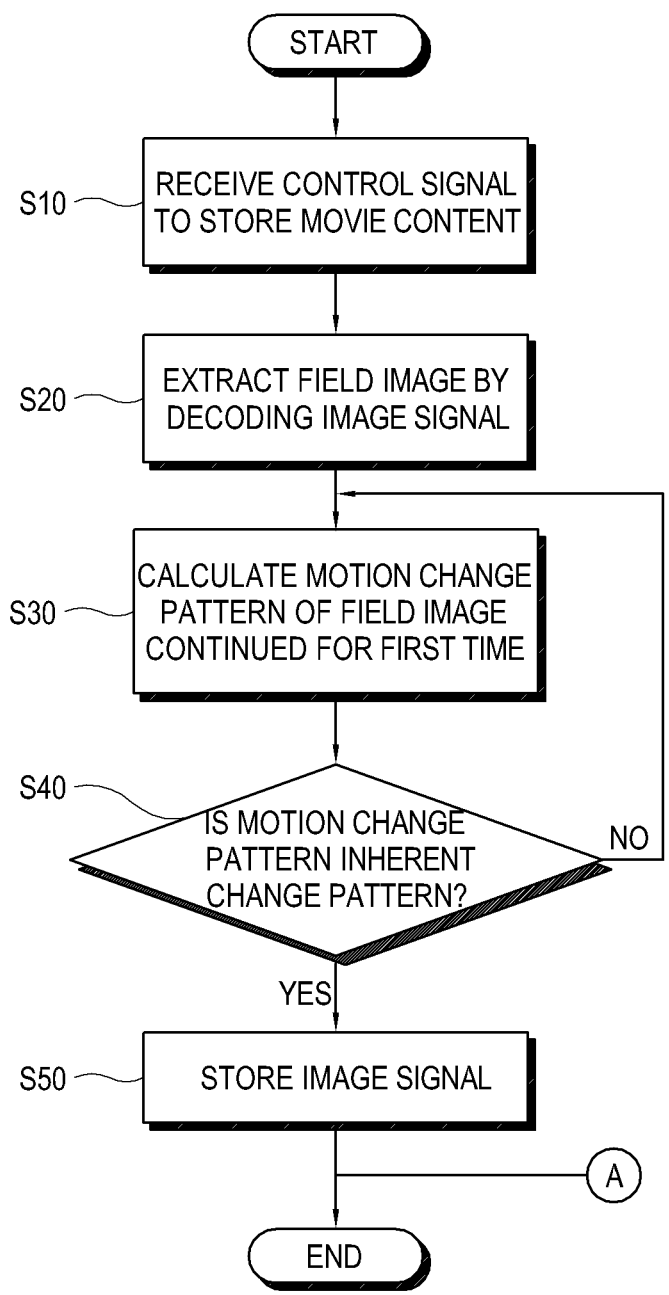
FIG. 3 is a control flowchart to describe a control method of the broadcasting processing apparatus according to the first exemplary embodiment of the present invention.

FIG. 3 is a control flowchart to describe a control method of the broadcasting processing apparatus according to the present embodiment. If the control signal is received to store the movie contents (S10), the signal processor 20 decodes the received image signal to extract the field image therefrom (S20). The field image which is transmitted from the decoder 21 includes substantial image information, and does not generate errors. In the related art broadcasting processing apparatus, if the image signal is stored with only picture information such as an intra I picture, a prediction P picture and a bi-direction B picture, errors are generated. That is, the related art broadcasting processing apparatus stores the image signal based on the decoded image information and time information, instead of determining the movie contents with the substantial image signal, thereby failing to store the movie contents completely due to errors in time information.

The controller 60 calculates the motion change pattern from the field images during the first period of time (S30), and determines whether the motion change pattern of the image signal corresponds to the inherent change pattern (S40).

If it is determined that the motion change pattern of the image signal corresponds to the inherent change pattern, the controller 60 determines that the received image signal is the film image signal, and stores the image signal in the storage unit 50 (S50).

If it is determined that the motion change pattern of the image signal does not correspond to the inherent change pattern, the controller 60 determines that the received image signal is the interlaced image signal, and returns to the operation S30 to calculate the motion change pattern of the image signal.

If the film image signal is not received for a predetermined time after the image signal is stored, the controller 60 determines that the reception of the image signal corresponding to the movie contents is completed, and ends the storage of the image signal.

Figure 4:
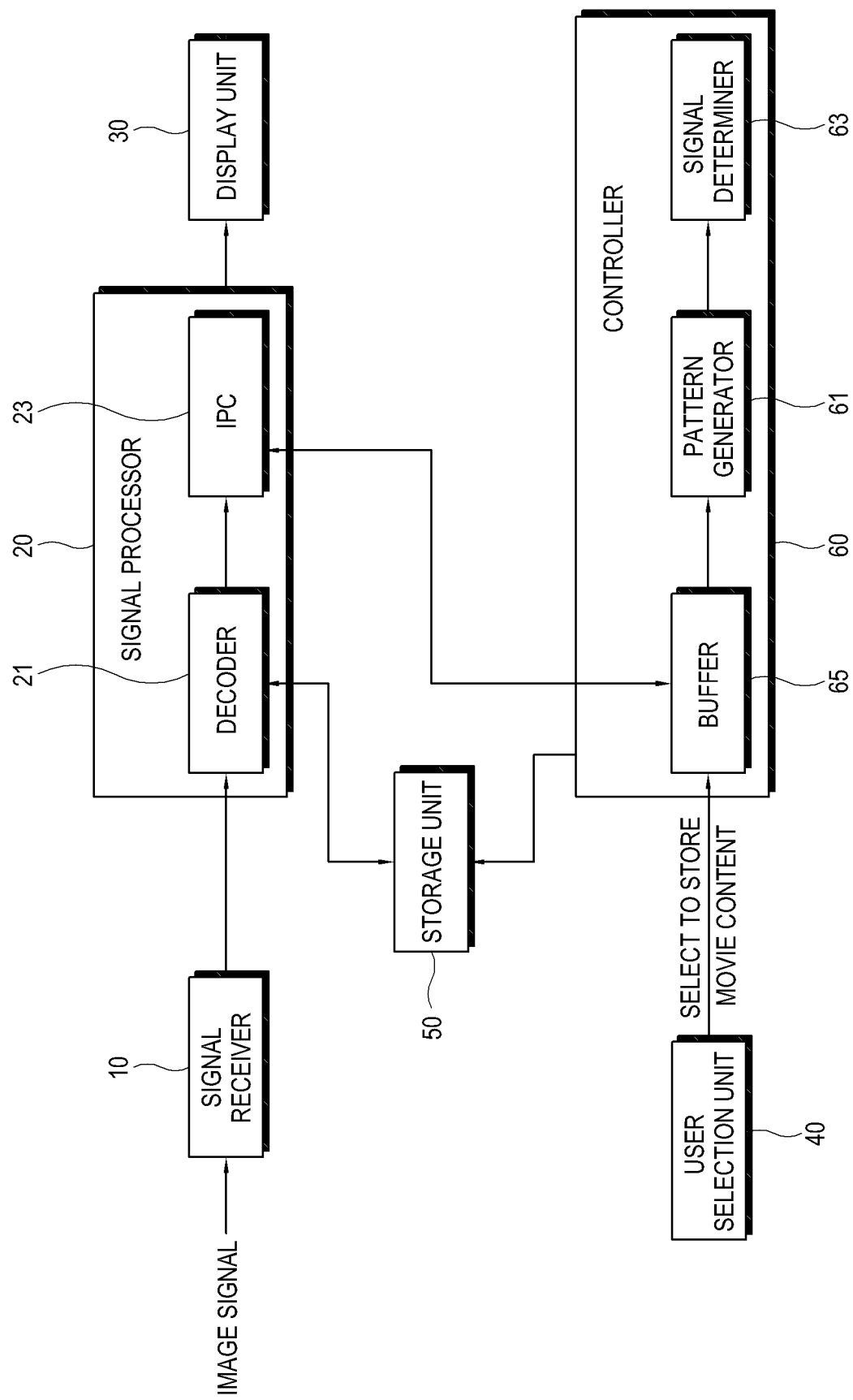
FIG. 4 is a control block diagram of a broadcasting processing apparatus according to a second exemplary embodiment of the present invention.

FIG. 4 is a control block diagram of a broadcasting processing apparatus according to a second exemplary embodiment of the present invention. The broadcasting processing apparatus according to the present embodiment has such a feature that it extracts and removes an advertisement image from a stored film image signal.

In recent years, advertisement or music video has been produced in a progressive film image. In this case, the advertisement image is also stored in the storage unit 50 according to the first exemplary embodiment of the present invention. If the advertisement image is received while the movie contents are received, the advertisement image is stored in the storage unit 50 since it is not an interlaced image signal. The broadcasting processing apparatus according to the present embodiment determines the advertisement image from the stored film image signal and removes the advertisement image therefrom.

The advertisement image has a motion change pattern different from that of a field image corresponding to the movie contents. The field image corresponding to the movie contents consecutively has three equivalent images and two equivalent images. However, the advertisement image receives completely different field images in every 15 to 30 seconds, and the continuity of the image signal is not maintained due to characteristics of advertisement. That means, the film image signal corresponding to the movie contents has a consistent frame rate of 24 frame/1 sec or 25 frame/1 sec. Meanwhile, the film image signal corresponding to the advertisement image does not have a consistent frame rate. The controller 60 calculates the motion change pattern of the film image signal and determines whether it is advertisement image or the movie contents image. In this case, the controller 60 should calculate the motion change pattern of the field images continued for approximately 30 to 90 seconds in consideration of characteristics of the advertisement image. The controller 60 includes a buffer 65 to buffer the field image during the foregoing time. That is, the controller 60 calculates the motion change pattern of the field images during a second period of time longer than the first period of time according to the first exemplary embodiment, i.e. for approximately 30 to 90 seconds according to the present embodiment. If the motion change pattern of the field image is different from the inherent change pattern, the controller 60 determines that the image signal is the advertisement image. If determined as the advertisement image, the image signal is removed from the storage unit 50 by the controller 60. If the advertisement image is removed by the controller 60, the storage unit 50 stores only the image signal corresponding to the genuine movie contents among the film image signals therein, thereby storing particular image signals alone desired by a user. Only the valid image signals are stored and the storage capacity is saved.

Figure 5:
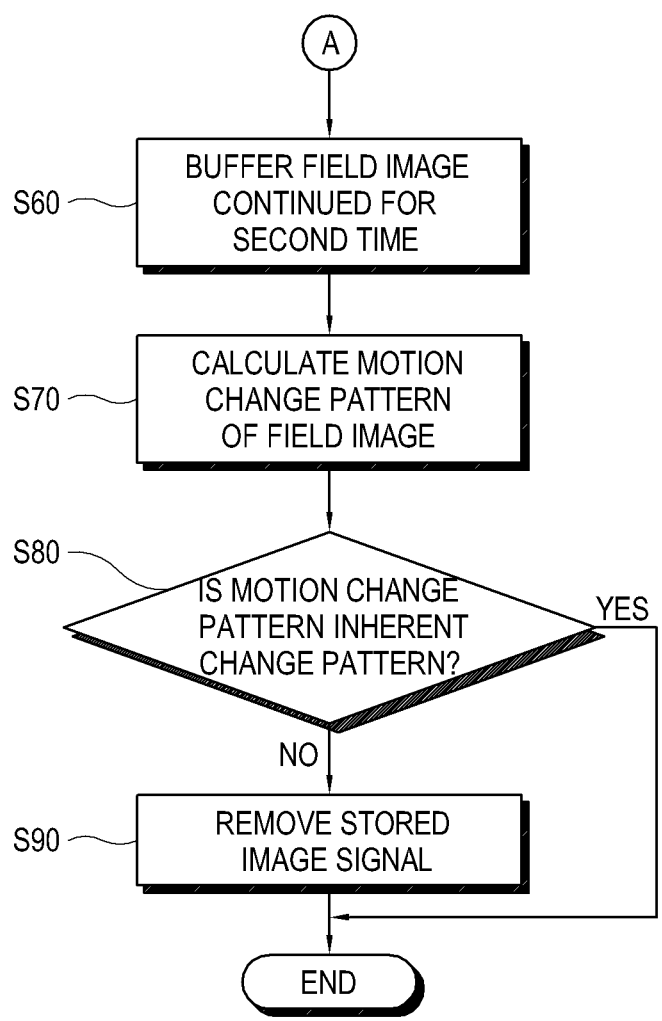
FIG. 5 is a control flowchart to describe a control method of the broadcasting processing apparatus according to the second exemplary embodiment of the present invention.

FIG. 5 is a control flowchart to describe a control method of the broadcasting processing apparatus according to the present embodiment. The control process according to the present embodiment is simultaneously performed with the storage process of the image contents according to the first exemplary embodiment. The image signal corresponding to the movie contents is stored like in the operation S50 in FIG. 3. At the same time, the controller 60 buffers the field image input in every second period of time (S60).

The controller 60 calculates the motion change pattern of the buffered field image (S70), and determines whether the motion change pattern of the field images is equivalent to the inherent change pattern (S80).

The operation S80 is performed to determine whether the buffered field image is the advertisement image or the movie contents, and is equivalent or similar to the operation S40 in FIG. 2. The determination of the types of the image signal may be realized by various known methods.

If it is determined that the motion change pattern of the field image is different from the inherent change pattern, and if the motion change pattern is not continuous, the controller 60 determines that the film image signal is the advertisement image, not the movie contents. That is, if the frame rate of the image signal is not the frame rate of the film image signal corresponding to the movie contents, the controller 60 determines that the film image signal is the advertisement image. Then, the controller 60 removes the image signal corresponding to the advertisement image from the stored image signals (S90).

If the received image signal is not the interlaced image signal, it is stored in the storage unit 50. If the received image signal is determined as the advertisement image, it is removed from the storage unit 50.

If the motion change pattern of the field image corresponds to the inherent change pattern, the control process according to the present embodiment ends. If the inputted image signal is not the film image signal, the storage process of the image signal ends and the film image is continuously stored.

According to another exemplary embodiment, the broadcasting processing apparatus may further include an interface (not shown) to transmit the image signal corresponding to the image contents stored in the storage unit 50 to the outside. The interface may include wired/wireless LAN for wired/wireless networks, a wireless communication unit for wireless communication such as Bluetooth, a USB port, a memory card slot, etc. Then, a user may use the user selection unit 40 and generate a control signal to transmit the stored image signal. The broadcasting processing apparatus may further include a UI generator to generate graphic user interface (GUI) information and transmit the image signal.

As described above, the exemplary embodiments of the present invention provide broadcasting processing apparatuses which store a desired image signal accurately, and a control method thereof.

Also, the exemplary embodiments of the present invention provide broadcasting processing apparatuses which prevent storage of an unnecessary image signal and saves storage capacity, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting processing apparatus comprising:
a storage unit;
a controller which, when a movie content storing function is selected, determines whether an image signal received by the broadcasting processing apparatus is a film image signal, and which stores the image signal in the storage unit if the image signal is determined to be a film image signal;
a decoder which decodes the image signal; and
an interlaced-to-progressive converter (IPC) which detects field images from the decoded image signal,
wherein the controller generates a motion change pattern based on field images detected during a first period of time, and determines that the image signal is a film image signal if the generated motion change pattern corresponds to a preset motion change pattern.

2. The broadcasting processing apparatus according to claim 1, wherein the controller generates a motion change pattern based on field images detected during a second period of time longer than the first period of time, determines that the image signal is an advertisement image signal if the motion change pattern of the second period of time is different from a preset motion change pattern, and removes the stored image signal corresponding to the advertisement image signal.

3. The broadcast processing apparatus according to claim 1, wherein the controller determines a frame rate of the image signal and determines that the image signal is an advertisement image signal if the determined frame rate is different from a preset frame rate.

4. The broadcasting processing apparatus according to claim 3, wherein the controller removes the stored image signal corresponding to the advertisement image signal.

5. The broadcasting processing apparatus according to claim 1, wherein the image signal stored in the storage unit is an encoded image signal.

6. A broadcasting processing apparatus, comprising:
a storage unit;

a controller which, when a movie content storing function is selected, determines whether a frame rate of an image signal received by the broadcasting processing apparatus is identical to a preset frame rate, and which stores the image signal in the storage unit if the frame rate of the image signal is identical to the preset frame rate;

a decoder which decodes the image signal; and an interlaced-to-progressive converter (IPC) which detects field images from the decoded image signal, wherein the controller determines the frame rate of the image signal based on a motion change pattern of the detected field images.

7. The broadcasting processing apparatus according to claim 6, wherein the preset frame rate is 24 or 25 frames per second.

8. A control method of a broadcasting processing apparatus, the control method comprising:

receiving a control signal to store movie content of an image signal received by the broadcasting processing apparatus;

detecting field images by decoding the image signal;

determining whether the image signal is a film image signal by using the detected field images; and storing the image signal if the image signal is determined to be a film image signal, wherein the determining whether the image signal is a film image signal comprises:

generating a motion change pattern based on field images detected during a period of time; and determining whether the generated motion change pattern is a preset motion change pattern.

9. The control method according to claim 8, further comprising:

determining whether the image signal is an advertisement image signal; and removing the stored image signal corresponding to the advertisement image signal if the image signal is determined to be an advertisement image signal.

10. The control method according to claim 9, wherein the determining whether the image signal is an advertisement image signal comprises:

generating a motion change pattern based on field images detected during a period of time; and determining that the image signal is an advertisement image signal if the generated motion change pattern is different from a preset motion change pattern.

11. The control method according to claim 8, wherein the determining whether the image signal is a film image signal comprises:

calculating a summed absolute difference between pixel values of neighboring field images among field images detected during a period of time;

generating a motion change pattern based on the calculated summed absolute differences; and determining whether the generated motion change pattern is a preset motion change pattern.

12. The control method according to claim 8, wherein the determining whether the image signal is a film image signal comprises:

generating a motion change pattern based on field images detected during a first period of time; and determining whether the generated motion change pattern is a preset motion change pattern.

13. The control method according to claim 12, further comprising:

generating a motion change pattern based on field images detected during a second period of time longer than the first period of time;

determining that the image signal is an advertisement image signal if the generated motion change pattern is different from a preset motion change pattern; and removing the stored image signal corresponding to the advertisement image signal if the image signal is determined to be an advertisement image signal.

14. The control method according to claim 13, wherein the generating a motion change pattern based on field images detected during a second period of time longer than the first period of time comprises:

buffering the field images for the second period of time.

15. The control method according to claim 13, wherein the first period of time has a length of 0.3 to 0.5 seconds and the second period of time has a length of thirty to ninety seconds.

16. The control method according to claim 8, further comprising:

ending the storing of the image signal if the image signal is determined not to be a film image signal for a predetermined time after the image signal is stored.

17. The control method according to claim 8, further comprising:

receiving the image signal by the broadcasting processing apparatus; and determining whether the received image signal is an interlaced image signal, wherein the image signal is not stored if the received image signal is determined to be an interlaced image signal and wherein the image signal is stored only if the received image signal is determined not to be an interlaced image signal.

* * * * *